US008711108B2

(12) United States Patent
Grunthaner et al.

(10) Patent No.: US 8,711,108 B2
(45) Date of Patent: Apr. 29, 2014

(54) DIRECT CONNECT SINGLE LAYER TOUCH PANEL

(75) Inventors: Martin Paul Grunthaner, San Francisco, CA (US); Steven Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 778 days.

(21) Appl. No.: 12/488,233

(22) Filed: Jun. 19, 2009

(65) Prior Publication Data

US 2010/0321326 A1  Dec. 23, 2010

(51) Int. Cl.
  G06F 3/041    (2006.01)
  G06F 3/045    (2006.01)
  G02F 1/1345   (2006.01)
  H05K 1/00     (2006.01)

(52) U.S. Cl.
  USPC ........... 345/173; 174/254; 361/784; 361/803; 349/149; 349/150

(58) Field of Classification Search
  USPC .................................................. 345/173–179
  See application file for complete search history.

(56) References Cited

U.S. PATENT DOCUMENTS

| | | | |
|---|---|---|---|
| 5,001,308 A * | 3/1991 | Mori ........................... | 200/5 A |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,300,997 B1 * | 10/2001 | Saito et al. ..................... | 349/149 |
| 6,310,610 B1 | 10/2001 | Beaton et al. | |
| 6,323,846 B1 | 11/2001 | Westerman et al. | |
| 6,326,553 B1 * | 12/2001 | Yim et al. ..................... | 174/254 |
| 6,508,664 B2 * | 1/2003 | Phalen ........................ | 439/502 |
| 6,690,387 B2 | 2/2004 | Zimmerman et al. | |
| 6,965,375 B1 | 11/2005 | Gettemy et al. | |
| 7,015,894 B2 | 3/2006 | Morohoshi | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Bipin Shalwala
*Assistant Examiner* — Benyam Ketema
(74) *Attorney, Agent, or Firm* — Morrison & Foerster LLP (57) ABSTRACT

A substantially transparent touch sensor panel having co-planar single-layer touch sensors and traces fabricated on a single side of a substrate for detecting single or multi-touch events. The touch sensor elements can be fabricated in columns and rows, with each sensor element in a row adjacent to a sensor element in a column. By using a board as the dielectric to connect traces from multiple sensor elements in each row, rather than using a dielectric layer on the substrate upon which the sensor elements and traces are formed, the sensor elements and traces on the substrate can be formed by simply patterning a single layer of conductive material on the substrate, which can simplify the manufacturing process of the substrate from a complexity and cost perspective.

27 Claims, 9 Drawing Sheets

(56) References Cited

U.S. PATENT DOCUMENTS

| | | | |
|---|---|---|---|
| 7,164,460 B2 * | 1/2007 | Hagiwara | 349/149 |
| 7,184,064 B2 | 2/2007 | Zimmerman et al. | |
| 7,227,537 B2 * | 6/2007 | Nakayama et al. | 345/173 |
| 7,253,808 B2 * | 8/2007 | Hong | 345/173 |
| 7,439,449 B1 * | 10/2008 | Kumar et al. | 174/254 |
| 7,455,529 B2 * | 11/2008 | Fujii et al. | 439/67 |
| 7,663,607 B2 | 2/2010 | Hotelling et al. | |
| 8,479,122 B2 | 7/2013 | Hotelling et al. | |
| 8,519,271 B2 * | 8/2013 | Oikawa et al. | 174/254 |
| 2004/0051699 A1 * | 3/2004 | Tanabe et al. | 345/173 |
| 2005/0012199 A1 * | 1/2005 | Rosenau et al. | 257/696 |
| 2006/0026521 A1 | 2/2006 | Hotelling et al. | |
| 2006/0097991 A1 | 5/2006 | Hotelling et al. | |
| 2006/0132462 A1 * | 6/2006 | Geaghan | 345/173 |
| 2006/0197753 A1 | 9/2006 | Hotelling | |
| 2006/0274055 A1 * | 12/2006 | Reynolds et al. | 345/174 |
| 2007/0178751 A1 * | 8/2007 | Yamamoto | 439/495 |
| 2008/0006453 A1 | 1/2008 | Hotelling | |
| 2008/0084530 A1 * | 4/2008 | Hirabayashi et al. | 349/150 |
| 2008/0158181 A1 | 7/2008 | Hamblin et al. | |
| 2009/0091551 A1 * | 4/2009 | Hotelling et al. | 345/174 |
| 2010/0149108 A1 * | 6/2010 | Hotelling et al. | 345/173 |
| 2010/0186995 A1 * | 7/2010 | Yeh | 174/254 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DIRECT CONNECT SINGLE LAYER TOUCH PANEL

FIELD OF THE DISCLOSURE

This relates generally to input devices for computing systems, and more particularly, to a multi-touch sensor panel capable of being fabricated in a single layer on one side of a substrate.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned partially or fully behind the panel so that the touch sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be implemented as an array of pixels formed by multiple drive lines (e.g. rows) crossing over multiple sense lines (e.g. columns), where the drive and sense lines are separated by a dielectric material. However, touch sensor panels having drive and sense lines formed on the bottom and top sides of a single substrate can be expensive to manufacture. One reason for this additional expense can be the thin-film processing steps performed on both sides of the glass substrate, which can require protective measures for the processed side while the other side is being processed. Another reason can be the cost of the flex circuit fabrication and bonding to connect to both sides of the substrate.

SUMMARY OF THE DISCLOSURE

This relates to a substantially transparent touch sensor panel having co-planar single-layer touch sensors and traces fabricated on a single side of a substrate for detecting single or multi-touch events (the touching of one or multiple fingers or other objects upon a touch-sensitive surface at distinct locations at about the same time). To avoid having to fabricate conductive layers on different sides of the substrate, embodiments of the disclosure can form the touch sensor elements and their corresponding traces in a single layer on one side of the substrate.

The sensor elements can be fabricated in any suitable shape and orientation. For example, in one embodiment the sensor elements can be fabricated in columns and rows, with each sensor element in a row adjacent to a sensor element in a column. Conductive traces can be routed in the single layer from each sensor element to a border area of the touch sensor panel, where they can terminate in pads for attachment to a board, such as a flex circuit or other connector for example, that can connect each trace to a controller. In order to connect each sensor element in a particular row to a single I/O port of the controller, conductive traces can be formed in the board to electrically connect the traces from each sensor element in a particular row to one another.

By using the board as the dielectric to connect traces from multiple sensor elements in each row, rather than using a dielectric layer on the substrate upon which the sensor elements and traces are formed, the sensor elements and traces on the substrate can be formed by simply patterning a single layer of conductive material on the substrate. This can simplify the manufacturing process of the substrate from a complexity and cost perspective. In other words, the processes needed to allow some traces to cross over other traces without shorting to each other to provide the necessary connectivity can be avoided when the board is used, because the board can provide vias and routing on a separate layer that achieves the equivalent of electrical crossovers.

DETAILED DESCRIPTION OF THE PREFERRED EMBODIMENTS

In the following description of preferred embodiments, reference is made to the accompanying drawings where it is shown by way of illustration specific embodiments in which the disclosure can be practiced. It is to be understood that other embodiments can be used and structural changes can be made without departing from the scope of the embodiments of this disclosure.

Embodiments of the disclosure relate to a substantially transparent touch sensor panel having co-planar single-layer touch sensors and traces fabricated on a single side of a substrate for detecting single or multi-touch events (the touching of one or multiple fingers or other objects upon a touch-sensitive surface at distinct locations at about the same time). To avoid having to fabricate conductive layers on different sides of the substrate, embodiments of the disclosure can form the touch sensor elements and their corresponding traces in a single layer on one side of the substrate.

The sensor elements can be fabricated in any suitable shape and orientation. For example, in one embodiment the sensor elements can be fabricated in columns and rows, with each sensor element in a row adjacent to a sensor element in a column. Conductive traces (lines) can be routed in the single layer from each sensor element to a border area of the touch sensor panel, where they can terminate in pads for attachment to a board, such as a flex circuit or other connector for example, that can connect each trace to a controller. In order to connect each sensor element in a particular row to a single I/O port of the controller, conductive traces can be formed in the board to electrically connect the traces from each sensor element in a particular row to one another.

By using the board as the dielectric to connect traces from multiple sensor elements in each row, rather than using a dielectric layer on the substrate upon which the sensor elements and traces are formed, the sensor elements and traces on the substrate can be formed by simply patterning a single layer of conductive material on the substrate. This can simplify the manufacturing process of the substrate from a complexity and cost perspective. In other words, the processes needed to allow some traces to cross over other traces without shorting to each other to provide the necessary connectivity can be avoided when the board is used, because the board can provide vias and routing on a separate layer that achieves the equivalent of electrical crossovers.

Although some embodiments of this disclosure may be described herein in terms of mutual capacitance multi-touch sensor panels, it should be understood that embodiments of this disclosure are not so limited, but are additionally applicable to self-capacitance sensor panels and single-touch sensor panels, and circuit boards in general. Furthermore, although the touch sensors in the sensor panel may be described herein in terms of an orthogonal array of touch sensors having rows and columns, embodiments of this disclosure are not limited to orthogonal arrays, but can be generally applicable to touch sensors arranged in any number of dimensions and orientations, including diagonal, concentric circle, three-dimensional and random orientations. It is further noted that the terms "column" and "row" are not intended to represent only one set of orientations (e.g., y-dimension columns and x-dimension rows), but rather can represent any set of orthogonal orientations (e.g., x-dimension columns and y-dimension rows, etc.).

Figure 1:
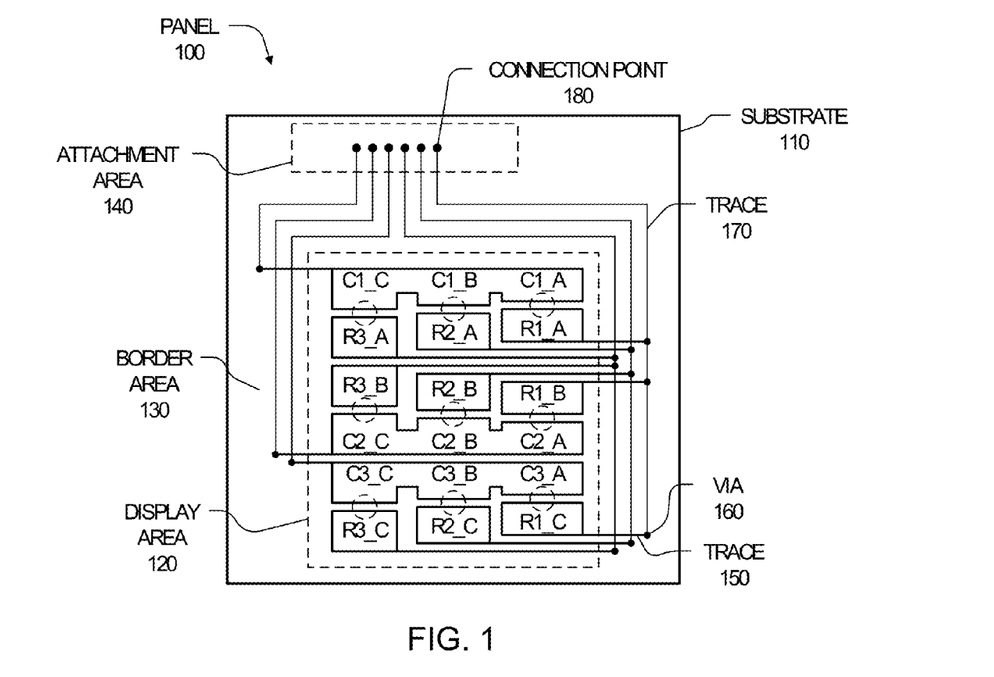
FIG. 1 illustrates an exemplary touch sensor panel with single layer rows and columns in a display area.

FIG. 1 illustrates an exemplary touch sensor panel with single layer rows and columns in a display area. In the illustrated embodiment, panel 100 can be formed of substrate 110 and include display area 120 and border area 130, which can extend beyond display area 120 and include attachment area 140 for connection to a board such as a flex circuit. In the simplified example of FIG. 1, panel 100 includes three columns (C1-C3) and three rows (R1-R3), although it should be understood that any number of columns and rows can be employed.

The columns can generally be columnar in shape, although in the example of FIG. 1 one side of each column can include staggered edges and notches designed to create separate sensor elements in each column (e.g., sensor elements C1_A, C1_B and C1_C). In other embodiments, each column can be formed of multiple distinct patches or pads representing distinct sensor elements. Each of rows R1-R3 can be formed from multiple distinct patches or pads representing distinct sensor elements, each patch including a trace that can be formed of the same material (e.g., Indium Tin Oxide) as the patch and routed to border area 130 of panel 100 for enabling all patches in a particular row to be connected together through conductive traces (e.g., metal traces) running in border area 130. These conductive traces (lines) can be routed to a small area on one side of panel 100 and connected to a board as disclosed in FIGS. 2 and 3. The patches forming the rows can be arranged in a generally pyramid-shaped configuration. In FIG. 1, for example, the patches for rows R1-R3 between columns C1 and C2 can be arranged in an inverted pyramid configuration when viewing display area 120 rotated 90 degrees counterclockwise.

The columns and patches of FIG. 1 can be formed in a co-planar single layer of conductive material. In touch screen embodiments, the conductive material can be a substantially transparent material such as Single-layer Indium Tin Oxide (SITO), although other materials can also be used. The SITO layer can be formed either on the back of a coverglass or on the top of a separate substrate. Although SITO may be referred to herein for purposes of simplifying the disclosure, it should be understood that other conductive materials can also be used according to embodiments of the disclosure.

It is noted that the illustration of border area 130 is enlarged for clarity. Each column can include a SITO trace that allows the column to be connected to a metal trace through a via (shown as a block dot on the left side of border area 130). Similarly, each patch in rows R1-R3 can include a SITO trace that can allow the patch to be connected to a metal trace through a via (shown as a block dot on the right side of border area 130). The metal traces can allow each patch in a particular row to be self-connected to each other. The metal traces in border area 130 can be formed on the same layer, and can be routed to attachment area 140 for connection to a board via connection points in attachment area 140.

Panel 100 can be operated as a mutual capacitance touch sensor panel. In such an embodiment, either the columns or the rows can be driven with one or more stimulation signals, and fringing electric field lines can form between adjacent column areas and row patches. Thus, it should be understood that each column-row patch pair, represented by dotted circles in FIG. 1, can represent a two-electrode pixel or sensor at which charge can be coupled onto the sense electrode from the drive electrode. For example, when a finger touches down over one of these pixels, some of the fringing electric field lines that extend beyond the cover of the touch sensor panel can be blocked by the finger, reducing the amount of charge coupled onto the sense electrode. This reduction in the amount of coupled charge can be detected as part of determining a resultant "image" of touch. It should be noted that in mutual capacitance touch sensor panel designs, no separate reference ground is necessary, so no second layer on the back side of substrate 110, or on a separate substrate, is necessary.

Panel 100 can also be operated as a self capacitance touch sensor panel. In such an embodiment, a reference ground plane can be formed on the back side of substrate 110, on the same side as the patches and columns but separated from the patches and columns by a dielectric, or on a separate substrate. Other ground planes present in a host system (such as an LCD with a substantially conductive thin-film transistor (TFT) or shield layer for example) can also play the role of the separate substrate ground. In a self capacitance touch sensor panel, each pixel or sensor can have a self capacitance to a reference ground that can be changed due to the presence of a finger or other object. In self capacitance embodiments, the self-capacitance of columns C1-C3 can be sensed independently, and the self capacitance of rows R1-R3 can also be sensed independently.

As illustrated in FIG. 1, the column edges and row patches can be staggered in the y-dimension to make space for the SITO traces emanating from the row patches. (It should be understood that adjacent patches in the same row, such as R3_A and R3_B for example, can also be formed as a single larger patch associated with one SITO trace.) To gain optimal touch sensitivity, it can be desirable to balance the areas of the electrodes associated with each two-electrode pixel, as illustrated in the different dimensions of the row patches and adjacent column sections in FIG. 1.

Further, it should be evident that raw spatial sensitivity can be somewhat distorted due to this staggered arrangement of touch sensor elements. In other words, because the pixels or sensors can be slightly skewed or misaligned in the y-dimension (relative to the orientation of the sensor elements in FIG. 1), the y-coordinate of a maximized touch event on pixel C1_A-R1_A (e.g. a finger placed down directly over pixel C1_A-R1_A) can be slightly different from the y-coordinate of a maximized touch event on pixel C1_C-R3_A, for example. Accordingly, in embodiments of the disclosure this misalignment can be de-warped in a software algorithm to re-map the pixels and remove the distortion.

Figure 2:
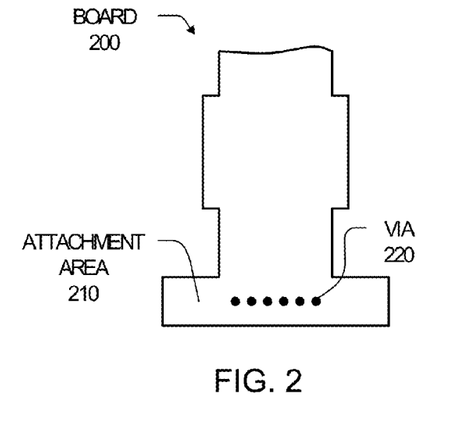
FIG. 2 illustrates an exemplary bottom side view of a board configured to be attached to the touch sensor panel of FIG. 1.
Figure 3:
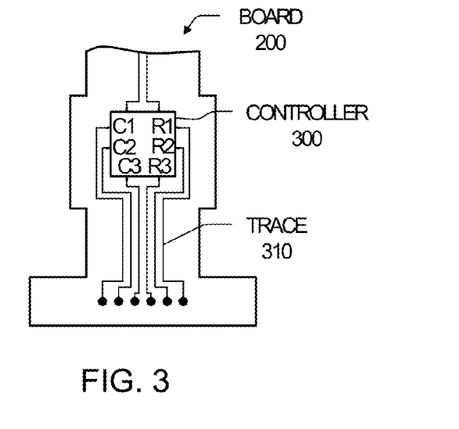
FIG. 3 illustrates an exemplary top side view of the board of FIG. 2.

A bottom side view and top side view of a board (e.g., a flex circuit) that can be attached to panel 100 is illustrated in FIGS. 2 and 3 respectively. In the illustrated embodiments of FIGS. 2 and 3, board 200 can include a bottom side having attachment area 210 for connection to attachment area 140 of panel 100, and a top side upon which controller 300 can be mounted.

In the embodiments of FIGS. 1-3, although the sensor elements in display area 120 can be formed in a single layer, a dielectric layer can be required in border area 130 of substrate 110 in order to facilitate the connection of row traces from multiple patches in each row to one another. For example, in order for trace 150 emanating from patch R1_C to connect to trace 170, it can be required to cross over a dielectric layer separating it from the other two vertical traces on the right side of border area 130, and connect to trace 170 through via 160 through the dielectric layer. Trace 170 can connect the other patches in the first row together (patches R1_A and R1_B) as illustrated, and terminate in connection point 180 in attachment area 140 of substrate 110. Board 200 can be bonded to substrate 110 such that connection point 180 can connect to via 220 through attachment area 210 of the bottom side in board 200. From there, via 220 can connect to trace 310 on the top side of board 200, which can route to the I/O port for row R1 associated with controller 300. Board 200 can include further traces connecting controller 300 to a host.

FIGS. 4-17 illustrate embodiments of the disclosure in which a board can be used as the dielectric to connect row traces from multiple patches in each row to one another, rather than a dielectric layer on the substrate upon which the sensor elements and traces are formed. In this manner, the sensor elements and traces on the substrate can be formed simply by patterning a single layer of conductive material on the substrate. This can simplify the manufacturing process of the substrate from a complexity and cost perspective by not having to include additional routing traces and a dielectric layer associated with the additional traces. In other words, the processes needed to allow some traces to cross over other traces without shorting to each other to provide the necessary connectivity can be avoided when the board is used, because the board can provide vias and routing on a separate layer that achieves the equivalent of electrical crossovers.

Figure 4:
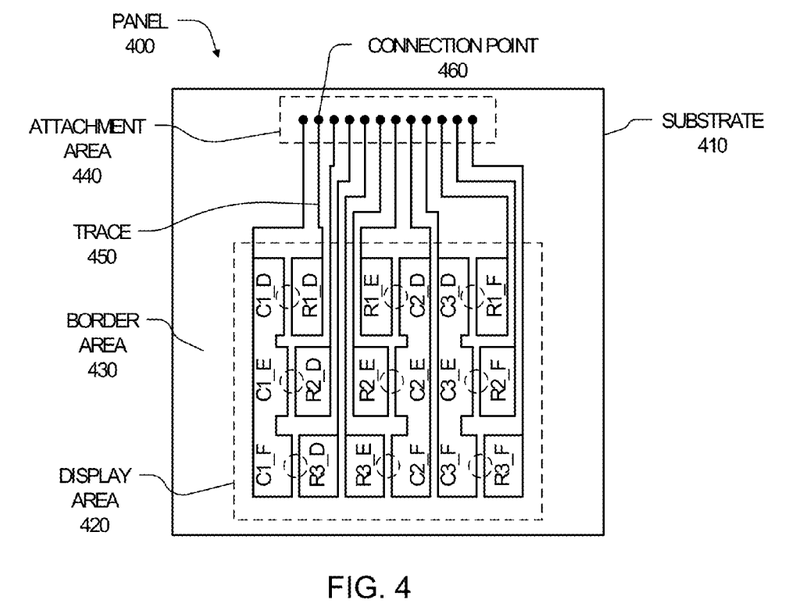
FIG. 4 illustrates an exemplary touch sensor panel with single layer rows and columns in a display and border area according to an embodiment of the disclosure.
Figure 5:
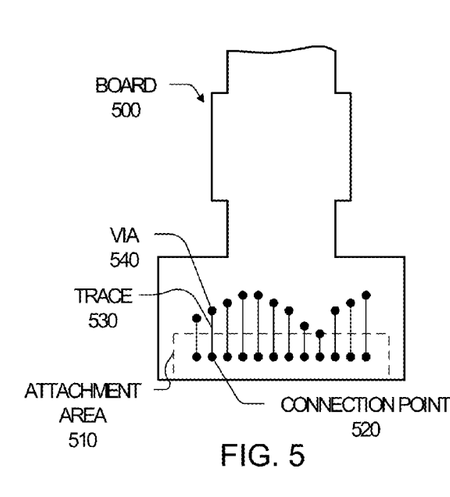
FIG. 5 illustrates an exemplary bottom side view of a board configured to be attached to the touch sensor panel of FIG. 4 according to an embodiment of the disclosure.
Figure 6:
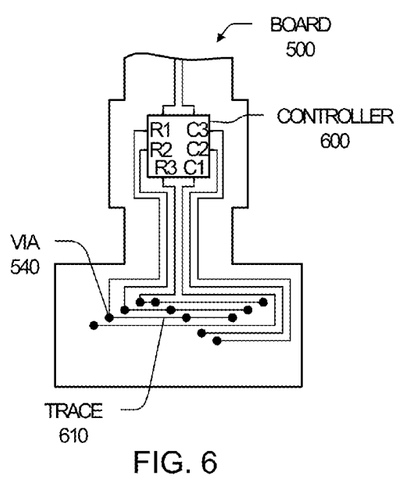
FIG. 6 illustrates an exemplary top side view of the board of FIG. 5 according to an embodiment of the disclosure.

In the embodiment illustrated in FIG. 4, panel 400 can be formed of substrate 410 and include display area 420 and border area 430, which can extend beyond display area 420 and include attachment area 440 for connection to a board, such as board 500 as illustrated in FIG. 5 (bottom side) and FIG. 6 (top side). The sensor elements and traces associated with panel 400 can be formed in a manner similar to those associated with panel 100, except that the traces associated with panel 400 extend directly from each sensor element to attachment area 440, where they may culminate in a pad for example. Since the traces of the patches in each row do not connect to each other on substrate 410, attachment area 440 can include a larger number of connection points (e.g., 12 points—representing each sensor element) than attachment area 140 (6 points—representing each row and column). It can be advantageous to arrange the connection points in attachment area 440 as widely and coarsely as possible, in order to simplify an optical alignment of board 500 when mounting board 500 to panel 400. Note that although FIG. 4 (and subsequent figures) illustrates columns connected to the attachment area using a single trace, in other embodiments in which the columns include multiple patches, multiple traces can connect the column patches to the attachment area.

In the illustrated embodiments of FIGS. 5 and 6, board 500 can include a bottom side having attachment area 510 for connection to attachment area 440 of panel 400, and a top side upon which controller 600 can be mounted. In order to conserve space in the y-dimension of panel 400, and to allow for a potentially longer display area 420 in the y-dimension, the connection points in attachment area 440 can be arranged linearly, and board 500 can be configured to include conductive traces (routing) on both sides of board 500 to facilitate the corresponding connections of row patches and routing to I/O ports of controller 600. For example, trace 450 on substrate 410 can connect patch R1_D to connection point 460 in attachment area 440 of substrate 410. Board 500 can be bonded to substrate 410 such that connection point 460 can connect to connection point 520 in attachment area 510 of the bottom side board 500. From there, trace 530 can connect to via 540 which connects to trace 610 on the top side of board 500. Trace 610 can route to the I/O port for row R1 associated with controller 600, and can connect to other vias for connection to other traces on substrate 410, so that multiple patches can be connected together. In this manner, the board provides vias and routing on a separate layer that achieves the equivalent of electrical crossovers to enable row patches to be connected together. Board 500 can similarly include further traces connecting controller 600 to a host.

Figure 7:
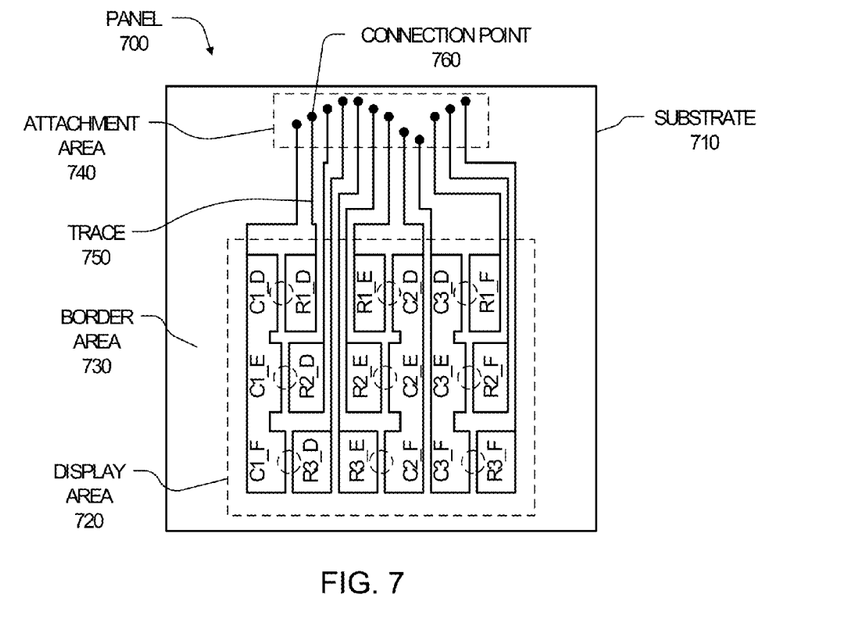
FIG. 7 illustrates an exemplary touch sensor panel with single layer rows and columns in a display and border area according to an embodiment of the disclosure.
Figure 8:
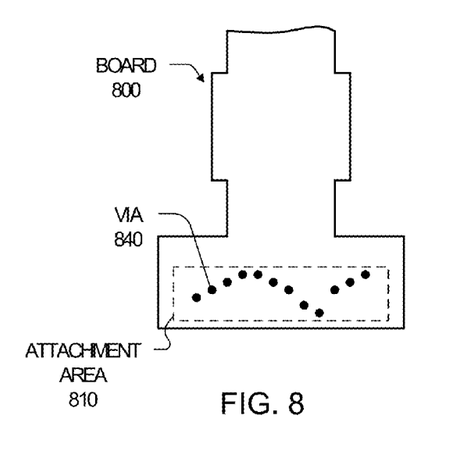
FIG. 8 illustrates an exemplary bottom side view of a board configured to be attached to the touch sensor panel of FIG. 7 according to an embodiment of the disclosure.
Figure 9:
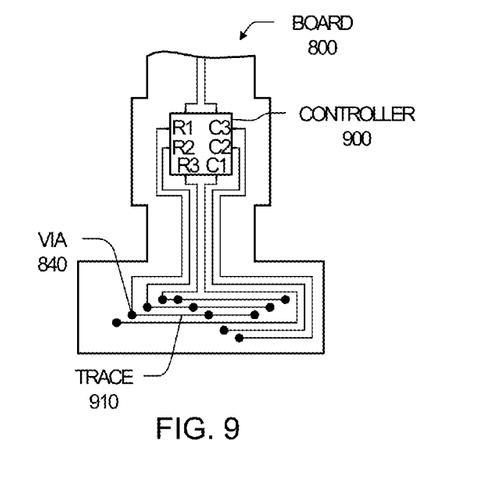
FIG. 9 illustrates an exemplary top side view of the board of FIG. 8 according to an embodiment of the disclosure.

FIGS. 7-9 disclose embodiments similar to those disclosed in FIGS. 4-6, except that the connection points in the attachment area of the substrate can be arranged in a staggered fashion, removing the need to form lines on the bottom side of the board.

In particular, in the embodiment illustrated in FIG. 7, panel 700 can be formed of substrate 710 and include display area 720 and border area 730, which can extend beyond display area 720 and include attachment area 740 for connection to a board, such as board 800 as illustrated in FIG. 8 (bottom side)

and FIG. 9 (top side). The sensor elements and traces associated with panel 700 can be formed in a manner similar to those associated with panel 400.

In the illustrated embodiments of FIGS. 8 and 9, board 800 can include a bottom side having attachment area 810 for connection to attachment area 740 of panel 700, and a top side upon which controller 900 can be mounted. In order to reduce the need for lines to be formed on the bottom side of board 800, the connection points in attachment area 740 can be staggered such that board 800 can be configured to include only small conductive traces on its bottom side to align with the corresponding connection points on substrate 710 and lines on its top side to facilitate the corresponding connections of row patches and routing to I/O ports of controller 900. For example, trace 750 on substrate 710 can connect patch R1_D to connection point 760 in attachment area 740 of substrate 710. Board 800 can be bonded to substrate 710 such that connection point 760 can connect to via 840 in attachment area 810 of the bottom side board 800. From there, via 840 can connect to trace 910 on the top side of board 800, which can route to the I/O port for row R1 associated with controller 900. Board 800 can similarly include further traces connecting controller 900 to a host.

Conductive traces formed of metal or substantially transparent conductive material such as SITO for example can be negatively affected by high resistance if patterned to narrowly. However, the resistivity of SITO can be substantially higher than that of metal, leading to substantially greater resistances with SITO than metal for similar trace dimensions. Consequently, to minimize the resistance for substantially transparent conductive traces for touch sensor panels of increased touch sensor resolution or larger size according to the embodiments of the present disclosure, a touch sensor panel can run the substantially transparent conductive traces for shorter distances to alternating sides of the panel as illustrated in FIG. 10.

Figure 10:
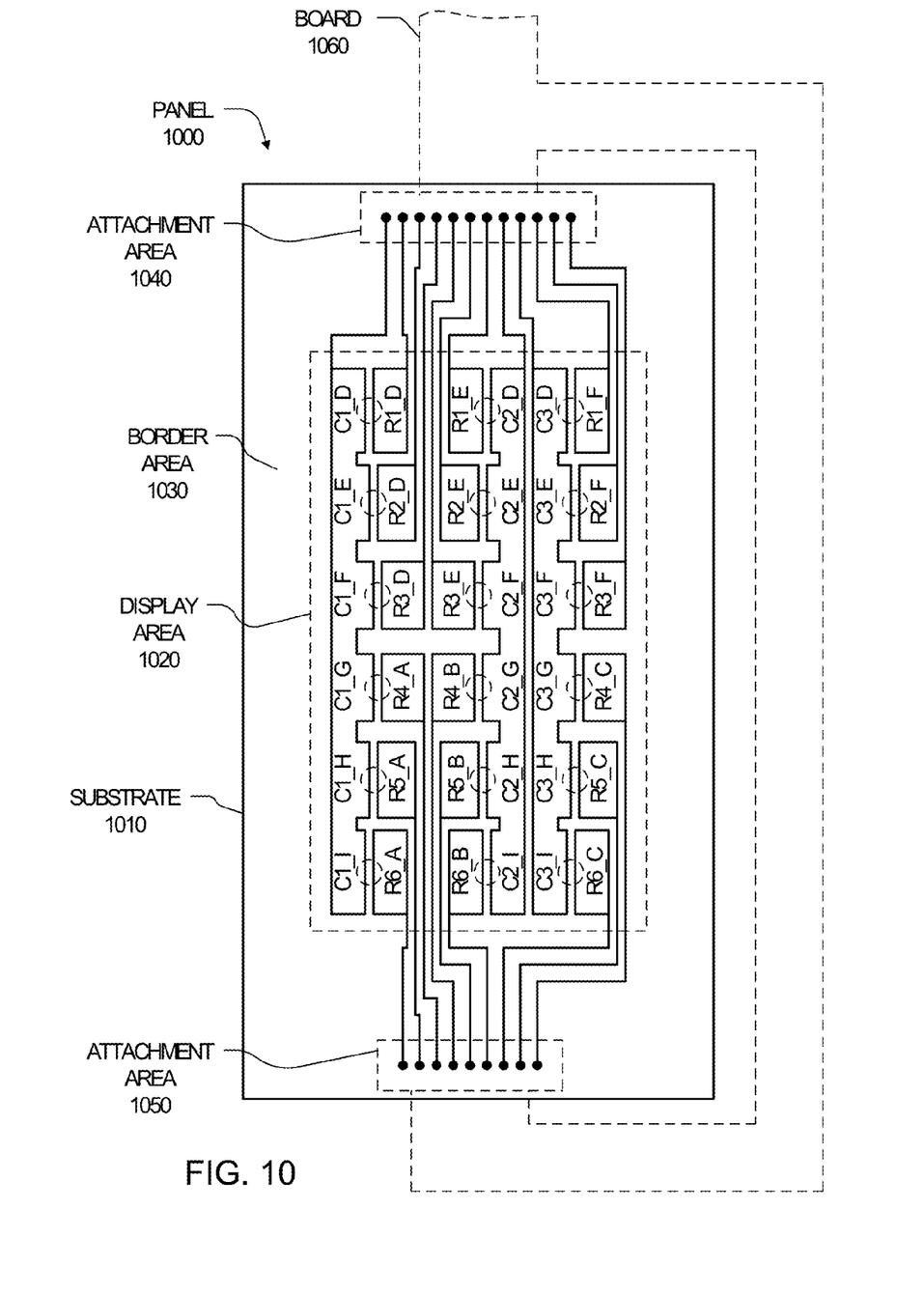
FIG. 10 illustrates an exemplary touch sensor panel with single layer rows and columns in a display and border area according to an embodiment of the disclosure.

In particular, in the embodiment illustrated in FIG. 10, panel 1000 can be formed of substrate 1010 and include display area 1020 and border area 1030, which can extend beyond display area 1020 and include attachment area 1040 and attachment area 1050 for connection to board 1060, which can wrap around panel 1000 to provide a connection pathway for all of the conductive traces formed on substrate 1010. The sensor elements and traces associated with panel 1000 can be formed in a manner similar to those associated with panel 400. By configuring the row sensors elements in the top half of display area 1020 in an inverted pyramid configuration that runs the corresponding conductive traces to attachment area 1040, while configuring the row sensors elements in the bottom half of display area 1020 in an upright pyramid configuration that runs the corresponding conductive traces to attachment area 1050, the area between the patches for running the conductive traces can be less squeezed than in an embodiment in which an inverted or upright pyramid configuration is maintained throughout the length of display area 1020. This dual configuration embodiment can enable the conductive traces associated with each sensor element to be patterned at a greater coarseness than may be possible if patterned in a single configuration embodiment with the same touch sensor resolution.

Figure 11:
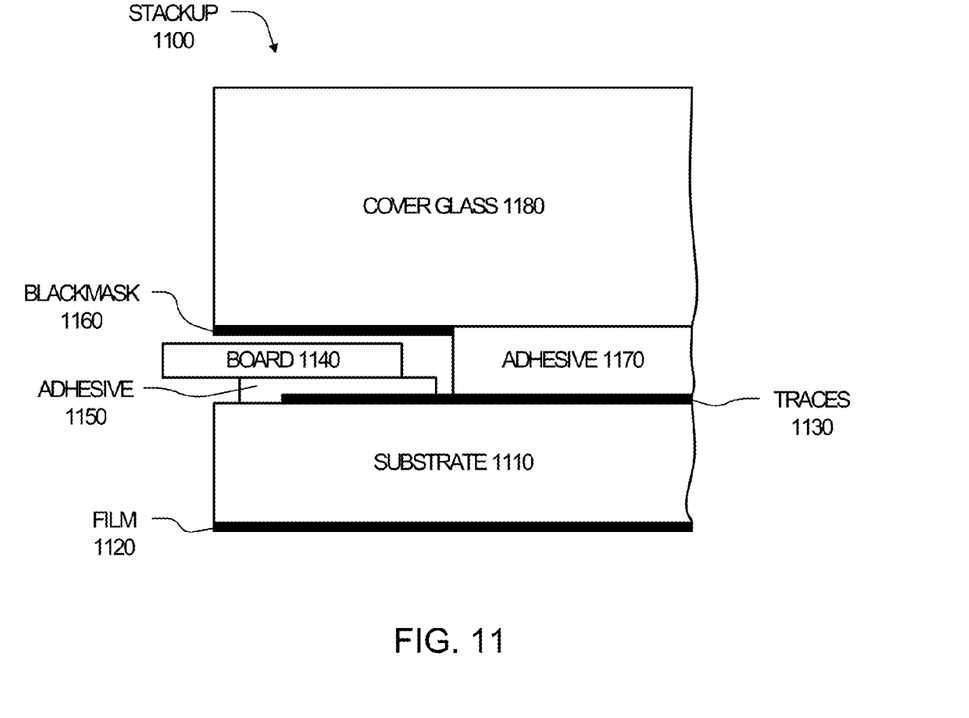
FIG. 11 illustrates an exemplary stackup of a touch sensor panel with single layer rows and columns in a display and border area according to an embodiment of the disclosure.

FIG. 11 illustrates an exemplary stackup of a touch sensor panel with single layer rows and columns in a display and border area according to an embodiment of the disclosure. Stackup 1100 can include touch sensor panel substrate 1110, which can be formed from glass for example, upon which anti-reflective (AR) film 1120 can be formed on one side and conductive traces 1130 can be deposited and patterned on the other side in a manner similar to those described above in connection with touch panels 400, 700 and 1000. Board 1140 can be bonded to traces 1130 and substrate 1110 using adhesive 1150 such as an anisotropic conductive film (ACF) for example. The entire subassembly can then be bonded to cover glass 1180 and blackmask 1160 using adhesive 1170 such as a pressure sensitive adhesive (PSA) for example. In an alternative embodiment, traces 1130 can be formed directly on the back side of cover glass 1180.

Figure 12:
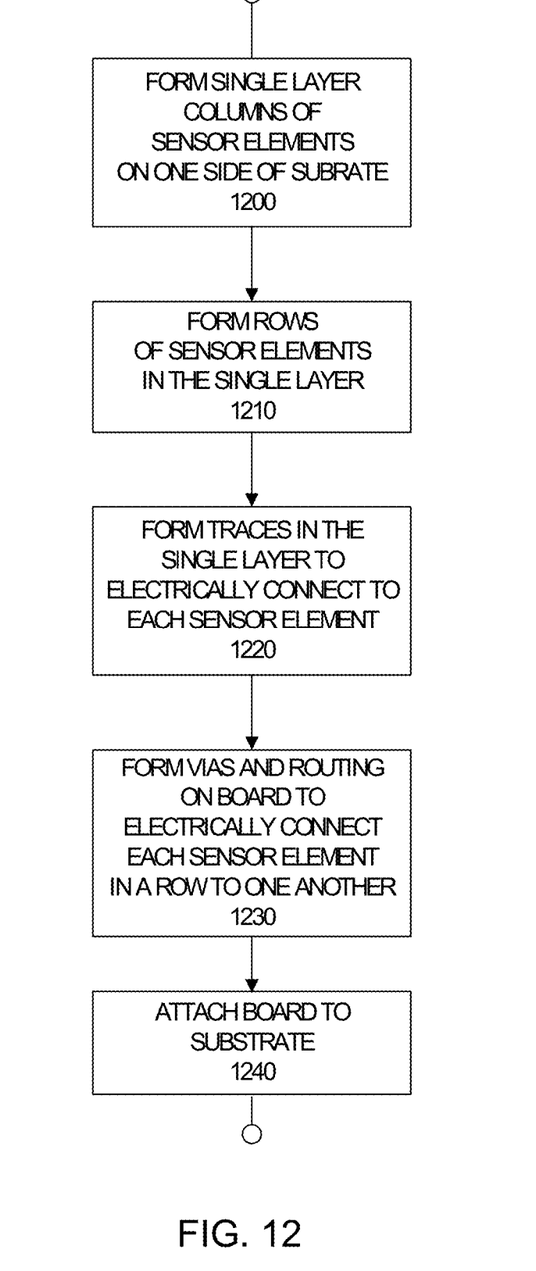
FIG. 12 illustrates an exemplary process for forming a touch sensor panel and board assembly according to an embodiment of the disclosure.

FIG. 12 illustrates an exemplary process for forming a touch sensor panel and board assembly according to an embodiment of the disclosure. In particular, for fabricating substrate traces, columns of sensor elements can be formed (block 1200) in a single layer of a conductive material on one side of a substrate as described above in connection with the embodiments of touch panels 400, 700 and 1000 for example. Rows of sensor elements can be formed (block 1210) in the single layer with each sensor element in a row adjacent to a sensor element in a column as described above in connection with the embodiments of touch panels 400, 700 and 1000 for example. And traces can be formed (block 1220) in the single layer to electrically connect to each of the sensor elements. The processes of blocks 1200, 1210 and 1220 can, in some embodiments, be performed at the same time by a single patterning process. For fabricating board traces, vias and routing can be formed (block 1230) on a board separate from the substrate to provide an equivalent of electrical crossovers to electrically connect each of the sensor elements in a row to one another while providing electrical isolation from sensor elements and traces associated with other rows, as described above in connection with the embodiments of boards 500, 800 and 1060 for example. The board can then be attached (block 1240) to the substrate, such as by a bonding agent for example.

Figure 13:
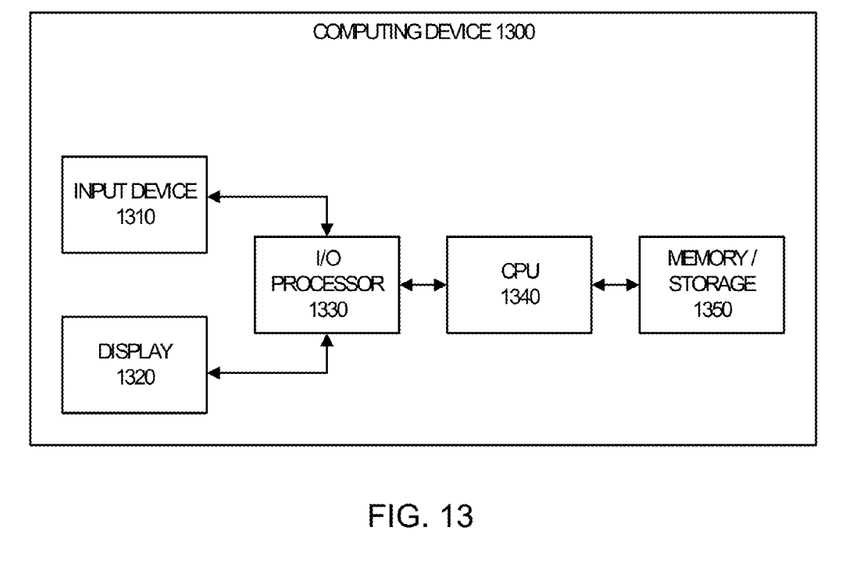
FIG. 13 illustrates an exemplary computing device architecture according to an embodiment of the disclosure.

FIG. 13 illustrates an exemplary architecture of computing device 1300. In particular, computing device 1300 can include input device 1310 (which can include a touch sensor panel and associated board similar to those described above in connection with FIGS. 4-12), display 1320, I/O processor 1330 (which can include a controller similar to those described above in connection with FIGS. 6 and 9), processor (CPU) 1340 and memory/storage 1350. Programming for processing input may be stored in memory/storage 1350 of computing device 1300, which may include solid state memory (RAM, ROM, etc.), hard drive memory, and/or other suitable memory or storage. CPU 1340 may retrieve and execute the programming to process output signals received from input device 1310. Through the programming, CPU 1340 can also perform actions based on output signals from input device 1310 that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, receiving a text message, sending a text message, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. CPU 1340 can also perform additional functions that may not be related to input device processing, and can be coupled to memory/storage 1350 and display 1320, which may include a liquid crystal display (LCD) for example, for providing a user interface (UI) to a user of the device.

Note that one or more of the functions described above can be performed by firmware stored in a memory (not shown) associated with I/O processor 1330 and executed by I/O processor 1330, and/or stored in memory/storage 1350 and executed by CPU 1340. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store a program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 14:
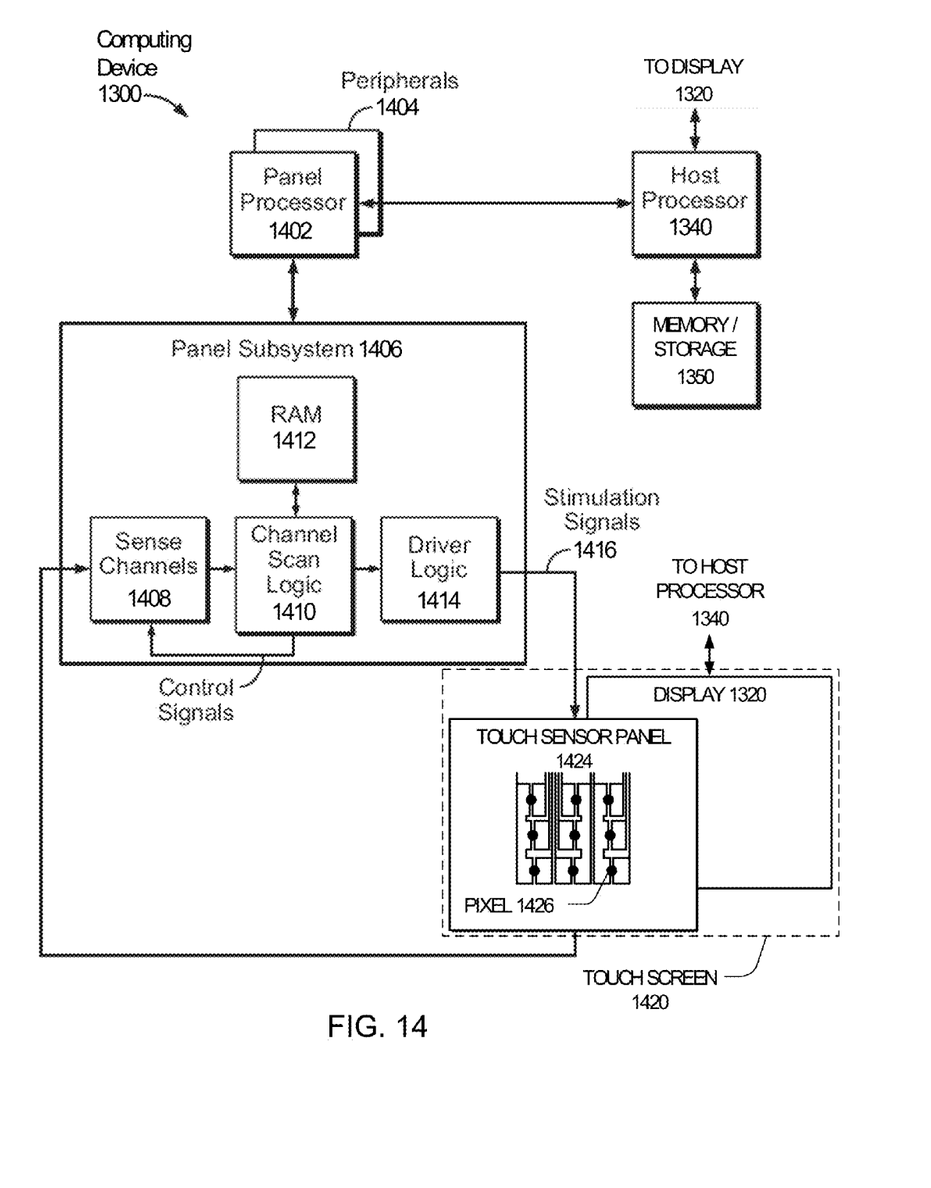
FIG. 14 illustrates an exemplary computing device including a touch sensor panel according to an embodiment of the disclosure

FIG. 14 illustrates an exemplary multi-touch sensor panel that can be associated with computing device 1300. Computing system 1300 can include one or more panel processors 1402 and peripherals 1404, and panel subsystem 1406 associated with a touch sensitive surface associated with input device 1310 as described above. Peripherals 1404 can include, but are not limited to, random access memory (RAM) or other types of memory or storage, watchdog timers and the like. Panel subsystem 1406 can include, but is not limited to, one or more sense channels 1408, channel scan logic 1410 and driver logic 1414. Channel scan logic 1410 can access RAM 1412, autonomously read data from the sense channels and provide control for the sense channels. In addition, channel scan logic 1410 can control driver logic 1414 to generate stimulation signals 1416 at various frequencies and phases that can be selectively applied to drive lines of touch sensor panel 1424. In some embodiments, panel subsystem 1406, panel processor 1402 and peripherals 1404 can be integrated into a single application specific integrated circuit (ASIC).

Touch sensor panel 1424 can include a capacitive sensing medium as described above although other sensing media can also be used. Each column-row patch pair as described above can represent a capacitive sensing node and can be viewed as picture element (pixel) 1426, which can be particularly useful when touch sensor panel 1424 is viewed as capturing an "image" of touch. In other words, after panel subsystem 1406 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). Each sense line of touch sensor panel 1424 can drive sense channel 1408 in panel subsystem 1406. The touch sensor panel can provide single layer rows and columns in a display and border area in accordance with the teachings as disclosed above. Touch screen 1420, which can include touch sensor panel 1424 and display device 1320, can be connected to other components in computing device 1300 through connectors integrally formed on the sensor panel or using flex circuits.

Figure 15:
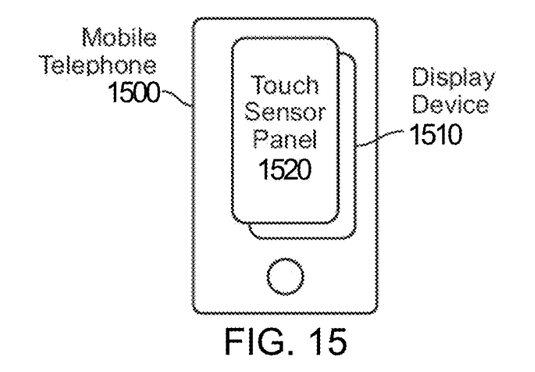
FIG. 15 illustrates an exemplary mobile telephone providing a touch sensor panel according to an embodiment of the disclosure.
Figure 16:
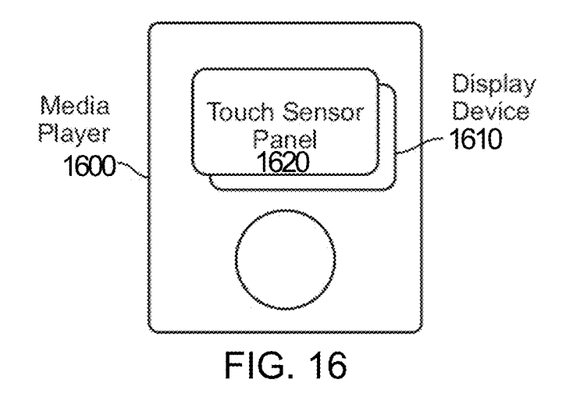
FIG. 16 illustrates an exemplary media player providing a touch sensor panel according to an embodiment of the disclosure.

Computing device 1300 can be any of a variety of types, such as those illustrated in FIGS. 15 and 16 for example. FIG. 15 illustrates exemplary mobile telephone 1500 with display device 1510 and touch sensor panel 1520. Touch sensor panel 1520 can be configured to provide single layer rows and columns in a display and border area in accordance with the teachings as disclosed above. FIG. 16 illustrates exemplary media player 1600 with display device 1610 and touch sensor panel 1620. Touch sensor panel 1620 can be configured to provide single layer rows and columns in a display and border area in accordance with the teachings as disclosed above. Additionally, computing device 1300 may be a combination of these types. For example, in one embodiment computing device 1300 may be a device that combines functionality of mobile telephone 1500 and media player 1600. By using a board as the dielectric to connect row traces from multiple patches in each row, rather than a dielectric layer on the substrate upon which touch sensor elements and traces can be formed, the touch sensor elements and traces on the substrate can be formed simply by patterning a single layer of conductive material on the substrate, which can simplify the manufacturing process of the substrate from a complexity and cost perspective.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in multiple units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus, comprising:
 a connecting board including a plurality of pads, the connecting board configured to be electrically coupled to a first substrate at the plurality of pads, the connecting board comprising a second substrate, different from the first substrate;
 a plurality of vias formed in the connecting board, each via electrically coupled to at least one of the plurality of pads; and
 routing formed on the connecting board and coupled to the vias, the routing arranged to electrically connect each of a plurality of discrete sensor elements in a row of the first substrate to one another while providing electrical isolation from sensor elements and traces associated with other rows.

2. The apparatus of claim 1, wherein the plurality of vias includes one or more sets of vias, and wherein the routing is coupled to the vias within each set of vias to provide electrical connectivity with a plurality of discrete sensor elements that form a particular row of the first substrate when the connecting board is attached to the first substrate.

3. The apparatus of claim 2, wherein the plurality of vias further includes one or more individual vias, and wherein the routing is coupled to each individual via to provide electrical connectivity to a continuous sensor element that forms a particular column of the first substrate when the connecting board is attached to the first substrate.

4. The first substrate coupled to the apparatus of claim 1, wherein the connecting board is attached to the first substrate at the plurality of pads, the first substrate comprising a touch sensor panel including:
 columns of continuous sensor elements formed in a single layer of a conductive material and supported on one side of the first substrate,
 rows of sensor elements formed in the single layer, each row including a plurality of discrete sensor elements, each sensor element in a row adjacent to a continuous sensor element in a column, and
 traces formed in the single layer electrically connected to each of the sensor elements.

5. The apparatus of claim 1, wherein the connecting board comprises a flex circuit.

6. The apparatus of claim 1, wherein each sensor element in a row together with an adjacent sensor element in a column form a mutual capacitance sensor.

7. The apparatus of claim 1, further comprising a ground plane supported on the first substrate, wherein each sensor element in a row together with the ground plane form a self capacitance sensor, and each sensor element in a column together with the ground plane forms a self capacitance sensor.

8. An input device comprising:
 a first substrate upon which columns of sensor elements, rows of sensor elements, and traces associated with each sensor element are formed in a single layer of a conductive material; and
 a connecting board attached through a plurality of pads to a plurality of the traces on the first substrate, the connecting board comprising a second substrate, different from the first substrate, the connecting board including a plurality of vias electrically coupled to the pads and routing formed on the connecting board and coupled to the vias, the routing arranged to electrically connect each of a plurality of discrete sensor elements in a row of the first substrate to one another while providing electrical isolation from sensor elements and traces associated with other rows.

9. The input device of claim 8, wherein the plurality of vias includes one or more sets of vias, and wherein the routing is coupled to the vias within each set of vias to provide electrical connectivity with a plurality of discrete sensor elements that form a particular row of the first substrate.

10. The input device of claim 9, wherein the plurality of vias further includes one or more individual vias, and wherein the routing is coupled to each individual via to provide electrical connectivity to a continuous sensor element that forms a particular column of the first substrate when the connecting board is attached to the first substrate.

11. The input device of claim 8, wherein the traces terminate at a first end of the first substrate.

12. The input device of claim 8, wherein some of the traces terminate at a first end of the first substrate, and other of the traces terminate at a second end of the first substrate opposite the first end.

13. The input device of claim 8, wherein the input device is part of a mobile telephone.

14. The input device of claim 8, wherein the input device is part of a media player.

15. A method for electrically connecting traces formed on a single layer on one side of a first substrate, comprising:
 forming a plurality of pads on a connecting board for attaching to the first substrate, the connecting board comprising a second substrate, different from the first substrate;
 forming a plurality of vias in the connecting board, each via electrically coupled to at least one of the plurality of pads, and forming routing on the connecting board and coupled to the vias, the routing arranged to electrically connect each of a plurality of discrete sensor elements in a row of the first substrate to one another while providing electrical isolation from sensor elements and traces associated with other rows.

16. The method of claim 15, wherein the plurality of vias includes one or more sets of vias, the method further comprising electrically connecting the vias within each set of vias to provide electrical connectivity with a plurality of discrete sensor elements that form a particular row of the first substrate when the connecting board is attached to the first substrate.

17. The method of claim 16, wherein the plurality of vias further includes one or more individual vias, the method further comprising electrically connecting to each individual via to provide electrical connectivity to a continuous sensor element that forms a particular column of the first substrate when the connecting board is attached to the first substrate.

18. The method of claim 15, further comprising attaching the connecting board to the first substrate to provide electrical connections.

19. A touch screen, comprising:
   a display;
   a first substrate proximate the display upon which a single layer of conductive material is patterned into columns of continuous sensor elements, rows of discrete sensor elements and a plurality of traces associated with each of the sensor elements; and
   a flex circuit attached through a plurality of pads to the plurality of traces on the first substrate, the flex circuit comprising a second substrate, different from the first substrate, the flex circuit including a plurality of vias electrically coupled to the pads and routing formed on the flex circuit and coupled to the vias, the routing arranged to electrically connect each of the discrete sensor elements in a row of the first substrate one another while providing electrical isolation from sensor elements and traces associated with other rows.

20. The touch screen of claim 19, wherein the plurality of vias includes one or more sets of vias, and wherein the routing is coupled to the vias within each set of vias to provide electrical connectivity with a plurality of discrete sensor elements that form a particular row of the first substrate.

21. A connector having vias and first traces formed in and on the connector, the vias and traces configured to:
   provide connectivity to second traces formed on a single layer on a circuit board, the circuit board comprising a first substrate; and
   enable non-adjacent second traces to be electrically connected to each other while providing electrical isolation from other second traces,
   wherein the connector comprises a second substrate, different from the first substrate.

22. The connector of claim 21, wherein the first traces are formed on a single side of the connector.

23. The connector of claim 21, wherein the first traces are formed on opposite sides of the connector.

24. The apparatus of claim 1, wherein the plurality of pads are formed on a first side of the connecting board and the routing is formed on a second side of the connecting board.

25. The input device of claim 8, wherein the plurality of pads are formed on a first side of the connecting board and the routing is formed on a second side of the connecting board.

26. The method of claim 15, further comprising forming the plurality of pads on a first side of the connecting board and forming the routing on a second side of the connecting board.

27. The touch screen of claim 19, wherein the plurality of pads are formed on a first side of the flex circuit and the routing is formed on a second side of the flex circuit.

* * * * *

UNITED STATES PATENT AND TRADEMARK OFFICE
CERTIFICATE OF CORRECTION

PATENT NO. : 8,711,108 B2  
APPLICATION NO. : 12/488233  
DATED : April 29, 2014  
INVENTOR(S) : Martin Paul Grunthaner et al.

Page 1 of 1

It is certified that error appears in the above-identified patent and that said Letters Patent is hereby corrected as shown below:

In the Claims:

Column 13, claim 19, line 27, delete the words "substrate one" and insert -- substrate to one --.

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,711,108 B2 | Page 1 of 1 |
| APPLICATION NO. | : 12/488233 | |
| DATED | : April 29, 2014 | |
| INVENTOR(S) | : Grunthaner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this
Eighth Day of September, 2015

Michelle K. Lee
*Director of the United States Patent and Trademark Office*